(12) United States Patent
Amma

(10) Patent No.: US 7,026,914 B1
(45) Date of Patent: Apr. 11, 2006

(54) SELECTIVE CALLING RECEIVER AND METHOD OF SWITCHING ALERT OPERATION THEREOF

(75) Inventor: Sadayuki Amma, Shizuoka (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/442,381

(22) Filed: Nov. 17, 1999

(30) Foreign Application Priority Data

Nov. 20, 1998 (JP) ................................. 10/330978

(51) Int. Cl.
G08B 5/22 (2006.01)

(52) U.S. Cl. .................. 340/7.39; 340/5.61; 340/7.45; 340/7.47

(58) Field of Classification Search ............... 340/5.61, 340/825.69, 825.72, 7.39, 7.45, 7.46, 7.47, 340/76.2, 7.1
See application file for complete search history.

(56) References Cited

U.S. PATENT DOCUMENTS

| | | | | |
|---|---|---|---|---|
| 4,975,693 A | * | 12/1990 | Davis et al. ........... | 340/825.44 |
| 5,304,986 A | * | 4/1994 | Motegi .................. | 340/636.15 |
| 5,307,059 A | * | 4/1994 | Connary et al. ....... | 340/825.44 |
| 5,739,759 A | * | 4/1998 | Nakazawa et al. ..... | 340/825.44 |
| 5,815,081 A | * | 9/1998 | Motohashi ............. | 340/825.44 |

FOREIGN PATENT DOCUMENTS

| | | |
|---|---|---|
| JP | 3-45028 | 2/1991 |
| JP | 4-33426 | 2/1992 |
| JP | 4-264828 | 9/1992 |
| JP | 5-110496 | 4/1993 |
| JP | 6-311086 | 11/1994 |
| JP | 7-50863 | 2/1995 |
| JP | 8-275216 | 10/1996 |
| JP | 2643619 | 5/1997 |
| JP | 10-23489 | 1/1998 |

* cited by examiner

Primary Examiner—Julie Bichngoc Lieu
(74) Attorney, Agent, or Firm—Scully, Scott, Murphy & Presser (57) ABSTRACT

A selective calling receiver includes first and second tables and a control section. The first table stores in advance setting information for automatically stopping sound generation and switching to another alert operation. The second table stores in advance setting information for continuous sound generation. The control section generates an alert instruction determined on the basis of the setting information stored in the first table or that stored in the second table in response to a received radio signal containing an ID number. A method of switching the alert operation of the receiver is also disclosed.

9 Claims, 12 Drawing Sheets

| ADDRESS ID INFORMATION | A/R INFORMATION | OPERATION INFORMATION OF VIBRATION DRIVER SECTION | SOUND GENERATION INFORMATION (SOUND VOLUME, SOUND TYPE) |
|---|---|---|---|

FIG.5

| SOUND TYPE INFORMATION: BEEP SOUND PATTERN 4 | SOUND VOLUME INFORMATION: LARGE |
|---|---|

| SOUND FREQUENCY INFORMATION | SOUND VOLUME INFORMATION | SOUND TYPE INFORMATION: BEEP SOUND PATTERN 4 |
|---|---|---|
| NON-USE: 1,330 Hz SINGLE USE: 2,660 Hz SINGLE NON-USE: 1,330 Hz AND 2,660 Hz MIX | USE: LARGE SOUND FREQUENCY INFORMATION NON-USE: SMALL | |

FIG.13

SELECTIVE CALLING RECEIVER AND METHOD OF SWITCHING ALERT OPERATION THEREOF

BACKGROUND OF THE INVENTION

1. Field of the Invention

The present invention relates to a selective calling receiver and, more particularly, to a selective calling receiver which allows a user to grasp the degree of emergency of a call with only the auditory sense and a method of switching the alert operation of the receiver.

2. Description of the Prior Art

Radio selective calling receivers are currently widely used as media for providing messages addressed to persons and information messages (e.g., stock prices).

The user of a radio selective calling receiver (selective calling receiver) is notified of reception of an incoming message addressed to the person by a alert means such as sound generation by a loudspeaker or vibration by a vibrator. The user recognizes the reception and then externally operates the receiver to stop the alert operation.

As a known technique associated with the present invention, Japanese Patent No. 2643619 discloses a technique associated with a radio selective calling receiver having an auto-reset function.

Figure 1:
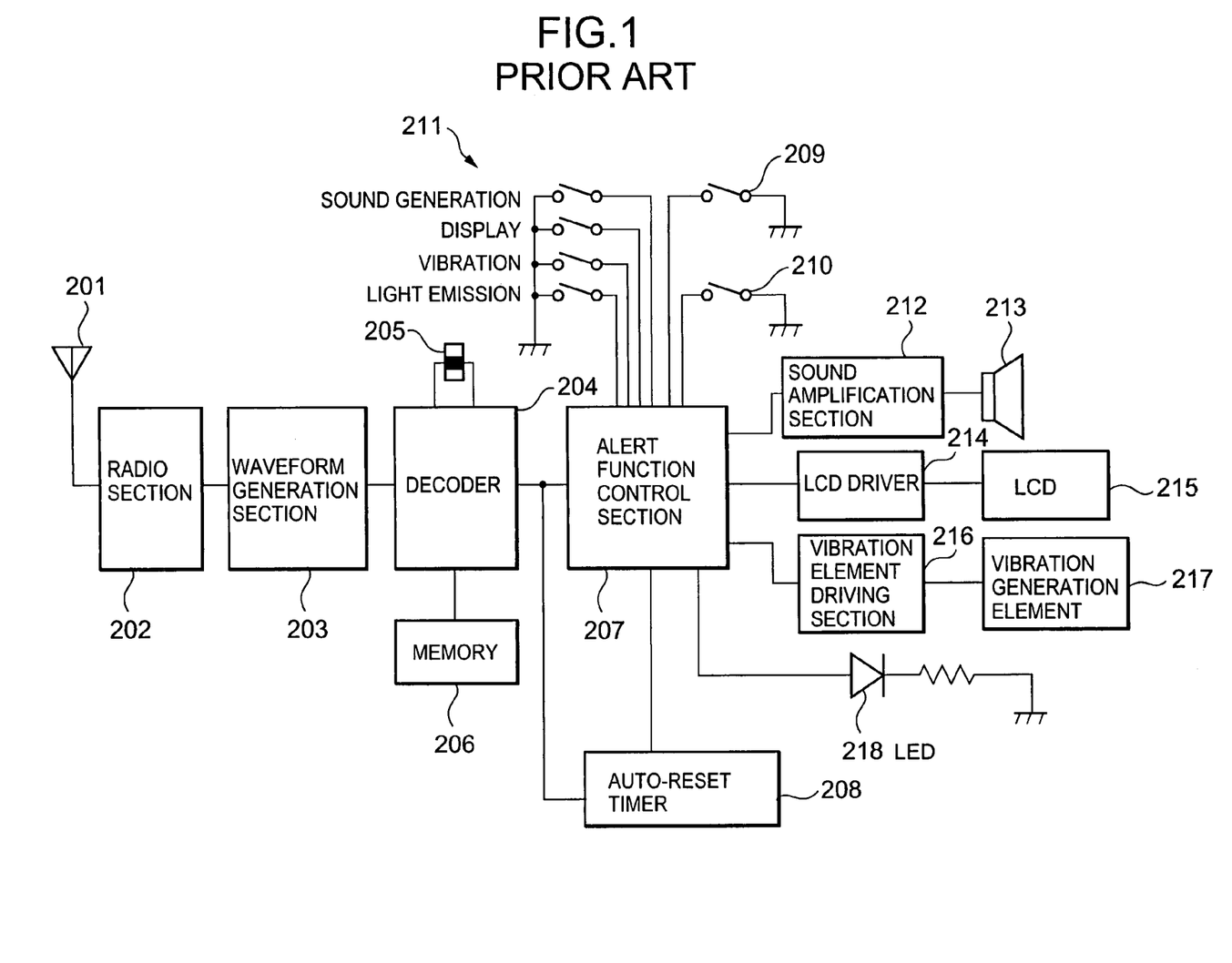
FIG. 1 is a block diagram showing the schematic arrangement of a conventional radio selective calling receiver.

FIG. 1 is a block diagram of this radio selective calling receiver. A radio signal received by an antenna 201 is amplified and demodulated by a radio section 202. The demodulated radio signal is shaped by a waveform generation circuit 203 into a waveform that can be read by a decoder 204, and output as a shaped radio signal.

A quartz oscillator 205 generates a reference clock. The shaped radio signal is synchronized with the generated reference clock. The decoder 204 compares an ID number contained in the synchronized radio signal with its own ID number stored in a memory section 206.

When it is determined by comparison that the two numbers match, the quartz oscillator 205 notifies an alert function control section 207 of it. The alert function control section 207 is connected to an auto-reset timer 208, mode change-over switch 209, reset switch 210, and auto-reset setting switch 211.

The auto-reset timer 208 counts a predetermined time. The mode change-over switch 209 switches between the auto-reset state and manual reset state of the alert function. The reset switch 210 performs manual reset. The auto-reset setting switch 211 selects one of the alert functions related to reception, i.e., sound generation, vibration, and light emission, which is automatically reset in setting manual reset, and sets the function.

The alert function control section 207 notifies the user of an incoming call in response to an alert from the decoder 204. As the alert means, one of a loudspeaker 213, LCD 215, vibration generation element 217, and light-emitting element 218 is set in advance.

Even when the various alert functions are switched to the manual reset state, this radio selective calling receiver automatically resets the alert function set by the auto-reset setting switch after the elapse of a predetermined time counted by the timer.

This radio selective calling receiver can prevent any wasteful current consumption. This receiver also alerts based on setting for continuously generating sound or based on setting for automatically resetting sound generation in accordance with the degree of emergency of a call.

However, the user cannot discriminate the sound pattern of alert based on setting for continuously generating sound from that of alert based on setting for automatically resetting sound generation. For this reason, the user must grasp the degree of emergency by confirming the displayed contents.

A demand has arisen for a selective calling receiver which allows the user to discriminate the sound pattern based on setting for continuous sound generation from that based on setting for automatically resetting sound generation and grasp the degree of emergency of a call.

SUMMARY OF THE INVENTION

The present invention has been made in consideration of the above situation to solve the above problem, and has as its object to provide a selective calling receiver which allows the user to grasp the degree of emergency of a call with only the auditory sense.

It is another object of the present invention to provide a selective calling receiver capable of selectively setting a sound pattern in accordance with the degree of emergency of a call on the basis of some degree of freedom.

It is still another object of the present invention to provide a selective calling receiver capable of easily switching between setting for continuous sound generation and setting for automatically resetting vibration by an external one-touch operation.

It is still another object of the present invention to provide a selective calling receiver capable of increasing the continuous sound generation time by reducing current consumption for continuous sound generation.

In order to achieve the above objects, according to the first main aspect of the present invention, there is provided a selective calling receiver comprising a first table storing in advance setting information for automatically stopping sound generation and switching to another alert operation, a second table storing in advance setting information for continuous sound generation, and a control section for generating an alert instruction determined on the basis of one of the setting information stored in the first table and the setting information stored in the second table in response to a received radio signal containing an ID number.

The selective calling receiver of the first main aspect has the following subordinate aspects.

A sound pattern in automatic stop and that in continuous sound generation are different from each other.

The setting information stored in the first table contains a number corresponding to the ID number, an instruction for instructing whether sound generation is to be automatically stopped, an instruction for instructing whether the alert operation is to be switched to another alert operation, and an instruction for instructing the alert operation using sound generation.

The instruction for the alert operation using sound generation includes an instruction for a volume of sound, an instruction for a pattern of beep sound, an instruction for a pattern of melody sound, and an instruction for a frequency of the sound.

The setting information stored in the second table contains an instruction for a type of sound set on the basis of current consumption of an alert section operated in response to the alert instruction, and an instruction for a volume of the sound.

The setting information stored in the second table contains an instruction for a frequency of sound, the frequency being selected from a plurality of frequencies set in advance, an instruction for a volume of the sound, the volumes being selected from a plurality of volumes set in advance, and an instruction for a type of the sound, the type being set on the basis of current consumption of an alert section operated in response to the alert instruction.

The receiver further comprises an external switch for switching the alert operation using sound generation based on the setting information in the second table to another alert operation based on the setting information in the first table.

Another alert operation is an alert operation using vibration.

In order to achieve the above objects, according to the second main aspect of the present invention, there is provided a method of switching an alert operation of a selective calling receiver, comprising the steps of (a) looking up a first table which stores in advance setting information for automatically stopping sound generation and switching to another alert operation in response to a received radio signal containing an ID number, the setting information containing a number corresponding to the ID number and an instruction for instructing whether sound generation is to be automatically stopped, (b) when it is determined by looking up the first table that the instruction is an instruction for automatically stopping sound generation, generating an alert instruction determined on the basis of the setting information for automatically stopping sound generation, and (c) when it is determined by looking up the first table that the instruction is an instruction for inhibiting automatic stop of sound generation, looking up a second table which stores in advance setting information for continuously generating sound and generating an alert instruction determined on the basis of the setting information for continuously generating sound.

According to the present invention having the above aspects, the ring when the continuous sound generation operation is set can be discriminated from that when the A/R function is set. Hence, the user can accurately grasp the degree of emergency with the auditory sense.

In addition, since setting for continuous sound generation and that for auto-reset of vibration can be easily switched by an external operation, the user can pursue convenience.

Furthermore, when a sound pattern which shortens the operation time for continuous sound generation is employed, the operation time of the alert section can be reduced to suppress current consumption, and the continuous sound generation time can be prolonged.

The above and many other objects, features and advantages of the present invention will become manifest to those skilled in the art in the art upon making reference to the following detailed description and accompanying drawings in which preferred embodiments incorporating the principle of the present invention are shown by way of illustrative examples.

DETAILED DESCRIPTION OF THE PREFERRED EMBODIMENTS

Preferred embodiments of the present invention will be described below with reference to the accompanying drawings.

A selective calling receiver according to the first embodiment of the present invention will be described with reference to the block diagram of FIG. 2.

A selective calling receiver (to be referred to as a receiver hereinafter) 101 has an antenna section 103, reception section 105, clock section 107, operation section 109, control section 111, display section 113, message memory section 115, program memory section 117, ID memory section 119, continuous sound generation data setting section 121, alert data setting section 123, alert section 125, and power supply section 131.

Figure 4:
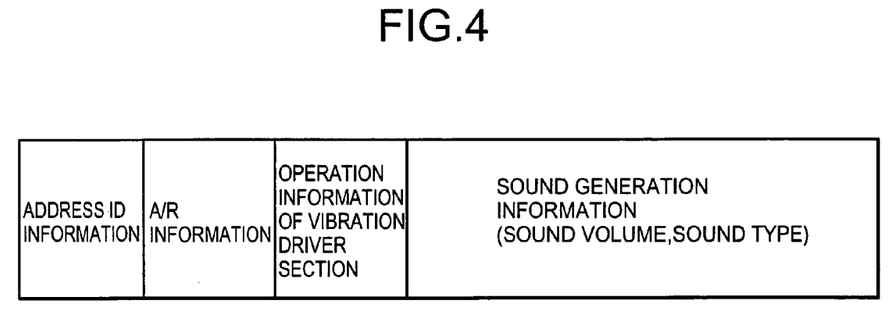
FIG. 4 is a view for explaining setting information stored in the first table in the first embodiment of the present invention.
Figure 5:
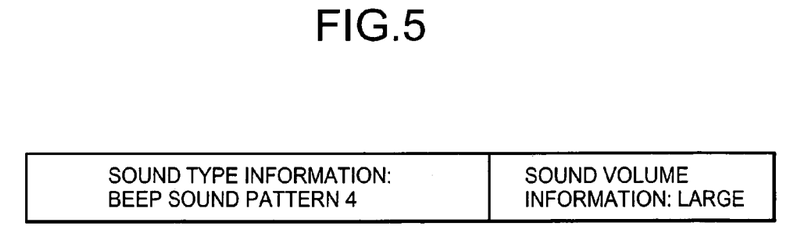
FIG. 5 is a view for explaining setting information stored in the second table in the first embodiment of the present invention.

In this embodiment, the alert data setting section 123 stores a first table 127 in advance (FIG. 4). The selective continuous sound data setting section 121 stores a second table 129 in advance (FIG. 5).

The program memory section 117 stores a control program for systematically controlling the operation of the receiver 101. The control section 111 executes the following operation on the basis of the control program. The power supply section 131 supplies power for operating the constituent elements of the receiver 101.

Figure 3:
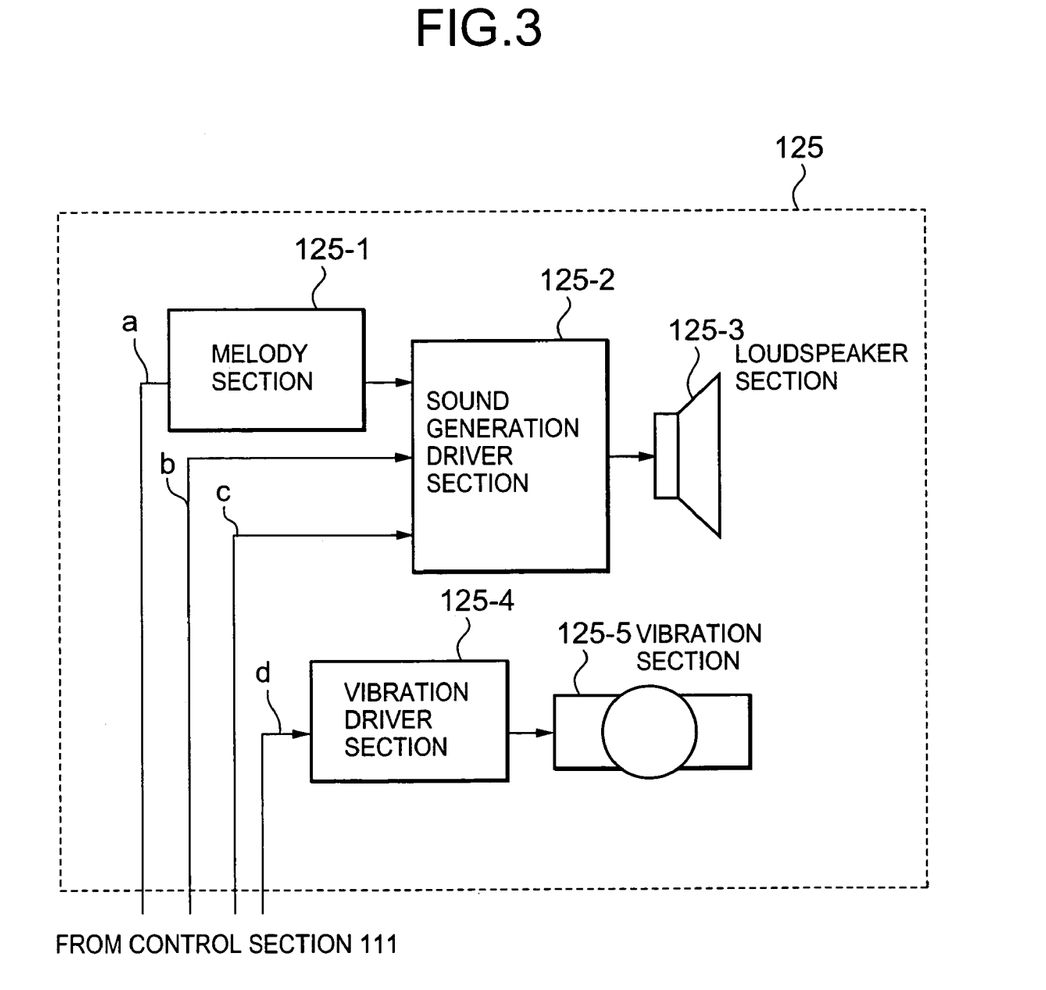
FIG. 3 is a block diagram showing the arrangement of the alert section of the selective calling receiver according to the first embodiment of the present invention.

FIG. 3 is a block diagram showing details of the alert section 125. The alert section 125 has a melody section 125-1, sound generation driver section 125-2, loudspeaker section 125-3, vibration driver section 125-4, and vibration section 125-5.

Figure 2:
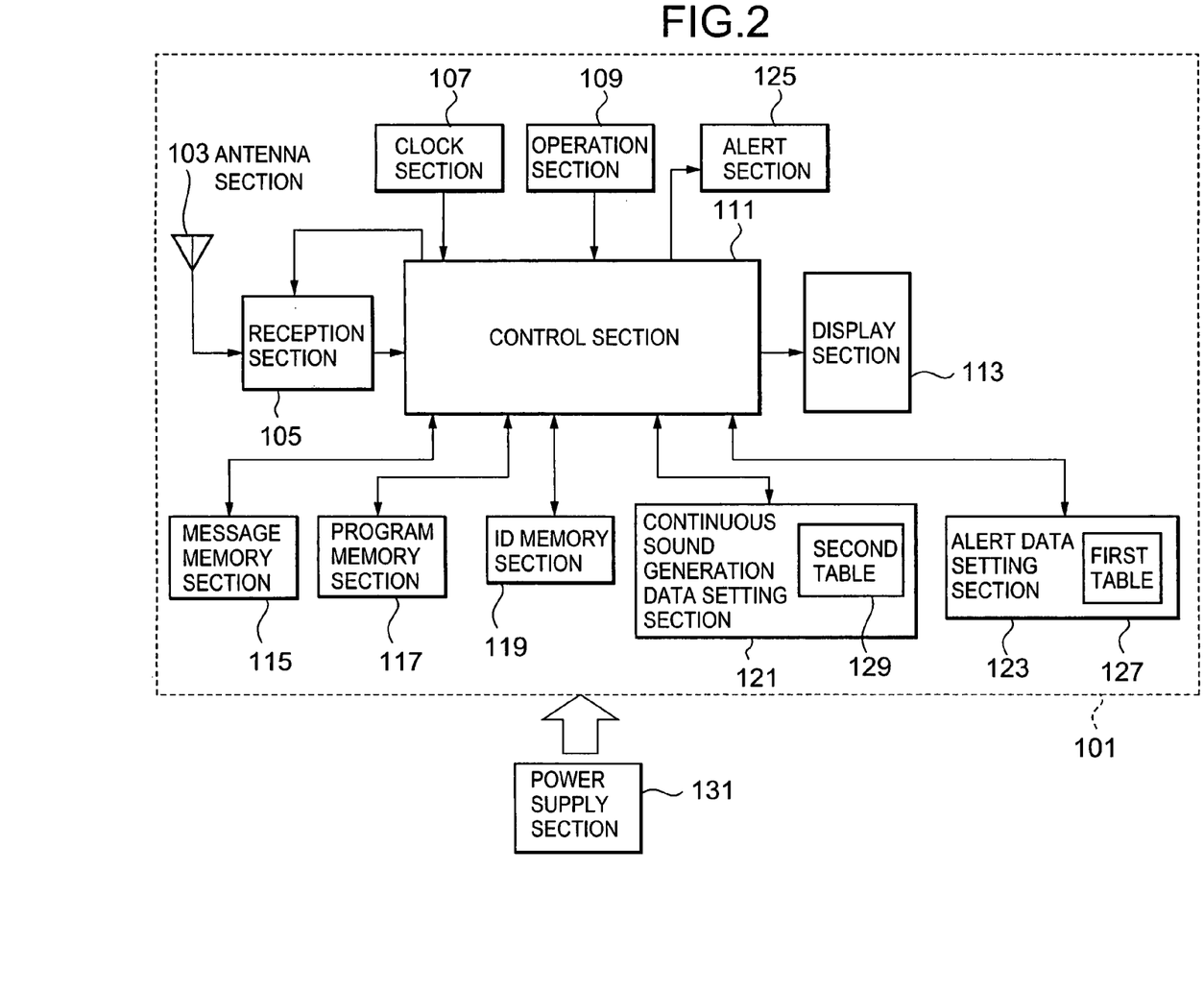
FIG. 2 is a block diagram showing the schematic arrangement of a selective calling receiver according to the first embodiment of the present invention.

Referring to FIG. 2, the reception section 105 amplifies and demodulates a radio signal (not shown) received via the antenna 103. The radio signal contains an ID number and a message. The control section 111 acquires the ID number on the basis of a clock signal (not shown) synchronized with the received radio signal.

The clock signal is generated by the clock section 107. The control section 111 compares the acquired ID number with each of ID numbers stored in the ID memory section 119.

When it is determined by comparison that the acquired ID number coincides with one of the ID numbers stored in the ID memory section 119, the control section 111 looks up the first table 127 stored in the alert data setting section 123.

FIG. 4 shows the contents of setting information in the first table 127. The first table 127 includes setting information for controlling the alert section 125 in alert. Address ID information is a number (address ID) corresponding to the ID number contained in the received radio signal.

Automatic stop (auto-reset: to be referred to as A/R hereinafter) information is set as an instruction for instructing whether sound generation is to be automatically stopped. Vibration driver information is set as an instruction for instructing whether the alert means (the vibration driver section 125-4 and, more particularly, the vibration section 125-5) using vibration is to be driven.

Sound generation information is set as instructions for sound generation and type of sound. The instructions for type of sound include an instruction for a beep sound pattern, an instruction for a melody sound pattern, and an instruction for the sound frequency.

The address ID information, A/R information, vibration driver information, and sound generation information of the first table 127 form setting information for automatically stopping sound generation.

Referring to FIG. 2, the control section 111 looks up the first table 127 and executes the alert operation based on the setting information containing the address ID corresponding to the ID number that coincides with one of the ID numbers.

When the A/R information is set at "ON" representing setting of the A/R function, the control section 111 generates a melody signal a volume signal b, beep signal c, and vibration signal d shown in FIG. 3 as alert instructions on the basis of the sound generation information and vibration driver information.

When the A/R information is set at "OFF" representing that the A/R function is not actuated, the control section 111 looks up the second table 129 that stores setting information for continuous sound generation. The second table 129 is stored in the continuous sound generation data setting section 121.

FIG. 5 shows the contents of setting information of the second table 129. Sound type information is set on the basis of the current consumption of the alert section 125 in the receiver 101.

In the first embodiment, for the least current consumption (in the receiver 101, the operation time per period becomes shortest), a sound pattern "beep sound/pattern 4" is set. Sound volume information is set at "large".

Referring to FIG. 2, the control section 111 generates the melody signal a, volume signal b, and beep signal c shown in FIG. 3 as alert instructions on the basis of the setting information of the second table 129.

When the received radio signal contains a message, the control section 111 stores the message in the message memory 115 and also displays the message on the display section 113.

The user of the receiver 101 externally operates the operation section 109 to reset the alarm (sound generation or vibration), confirm the displayed contents, and set the setting information of the first and second tables 127 and 129.

The receiver 101 has the first table 127, second table 129, and control section 111. The first table 127 stores setting information for automatically stopping sound generation in advance. The second table 129 stores setting information for continuously generating sound in advance.

The control section 111 generates an alert instruction in response to the received radio signal containing the ID number. The alert instruction is determined on the basis of the setting information stored in the first table 127 in advance and the setting information stored in the second table 129 in advance.

On the basis of the setting information set together with the address ID set in the first table 127, the control section 111 determines whether the alert operation is to be automatically stopped or continued and generates a corresponding alert instruction. The ID number in the received radio signal corresponds to the address ID set in the first table 127.

As for the sound generated on the basis of the alert operation, the sound pattern in automatically stopping sound generation is different from that in continuous sound generation. The sound pattern corresponds to the frequency and type of sound.

Figure 6:
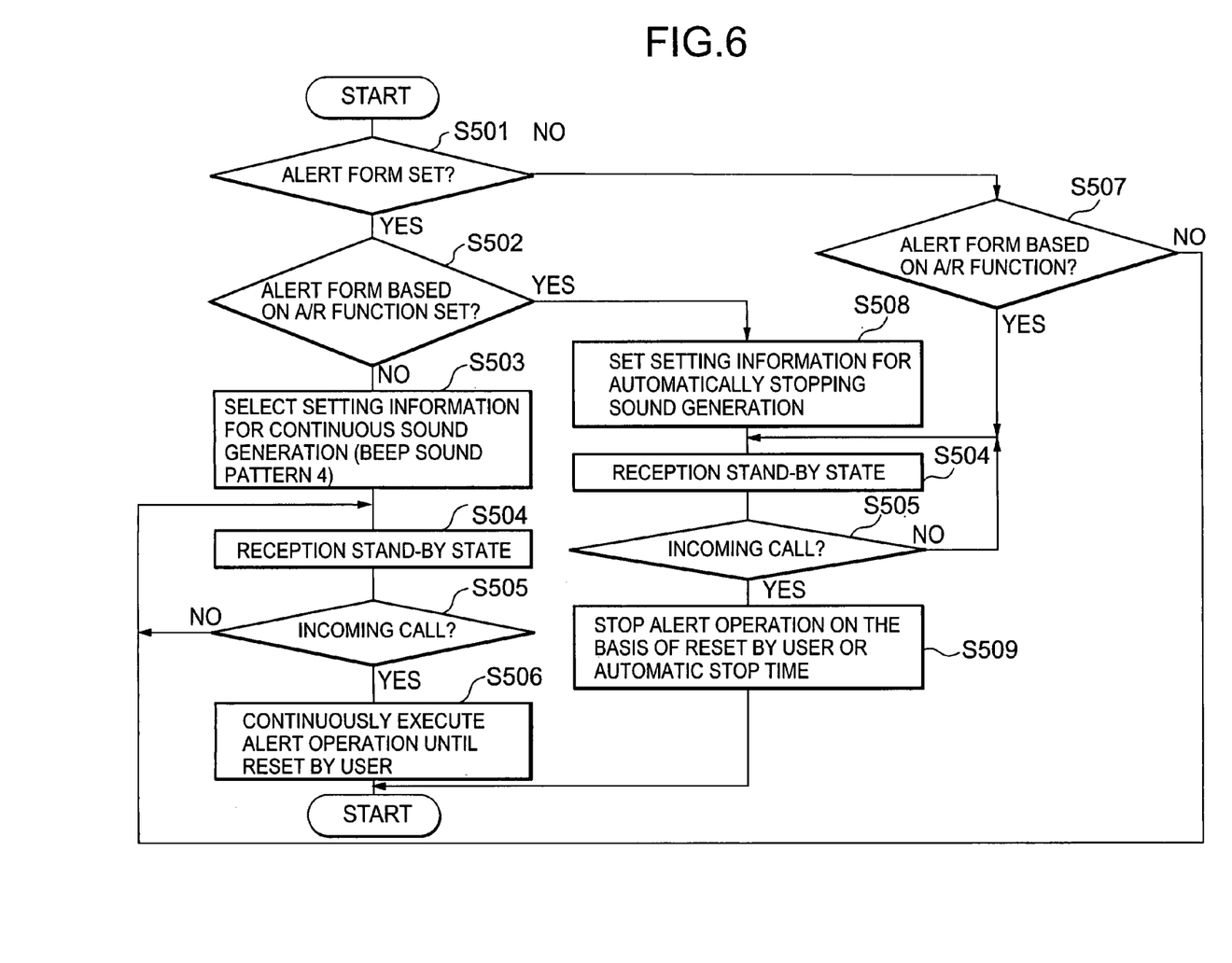
FIG. 6 is a flow chart for explaining the operation of the selective calling receiver according to the first embodiment of the present invention.

FIG. 6 is a flow chart showing the operation of the receiver 101. In step S501, whether the alert form is to be set is selected. If the alert form is set (step S502), whether the alert form using the A/R function is to be set is selected.

If the alert form using the A/R function is not selected (a function of continuously generating sound is selected), setting information (beep sound/pattern 4) based on FIG. 5 is selected (step S503).

After step S503, when the receiver receives a call in the stand-by state (step S504) (YES in step S505), it continuously executes alert operation in accordance with the alert instruction determined on the basis of the sound pattern (beep sound/pattern 4) until the alert operation is reset by the user through the operation section 109 (step S506).

Processing executed when the alert form is not selected (NO in step S501), and the alert form using the A/R function is set (YES in step S507) will be described.

In this case, setting information for automatically stopping sound generation is set in advance (step S508). The alert operation is executed in response to the alert instruction determined on the basis of setting information for automatically stopping sound generation after the stand-by state. The alert operation is stopped by the user's reset operation or after the elapse of the automatic stop time (step S509).

Figure 7A:
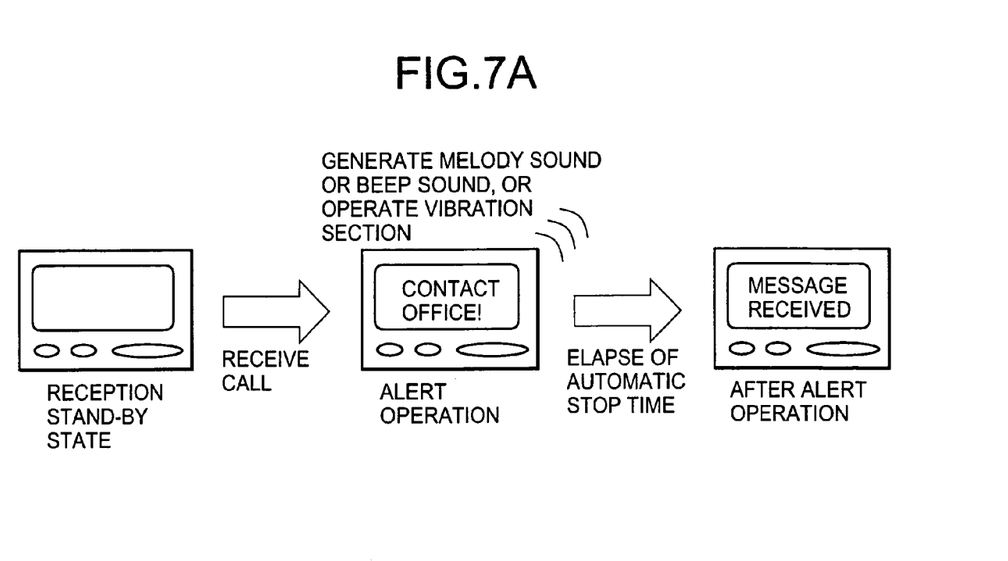
FIGS. 7A and 7B are views for explaining the alert operation based on setting information for automatically stopping sound generation and that based on setting information for continuously generating sound, respectively.
Figure 7B:
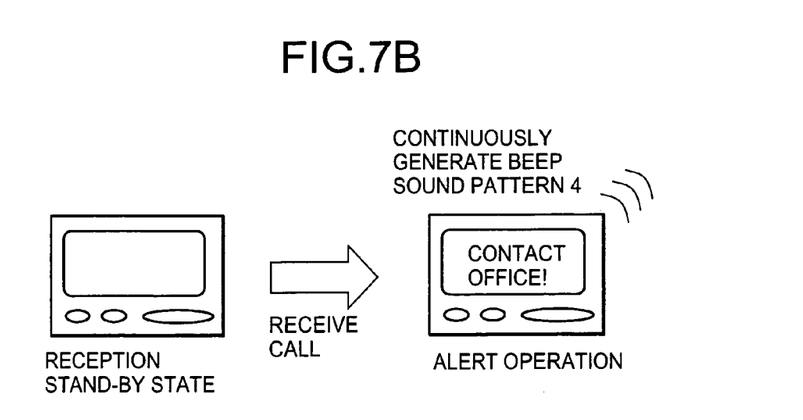

FIG. 7A shows the alert operation executed on the basis of the setting information for automatically stopping sound generation. FIG. 7B shows the alert operation executed on the basis of the setting information for continuous sound generation.

Figure 8:
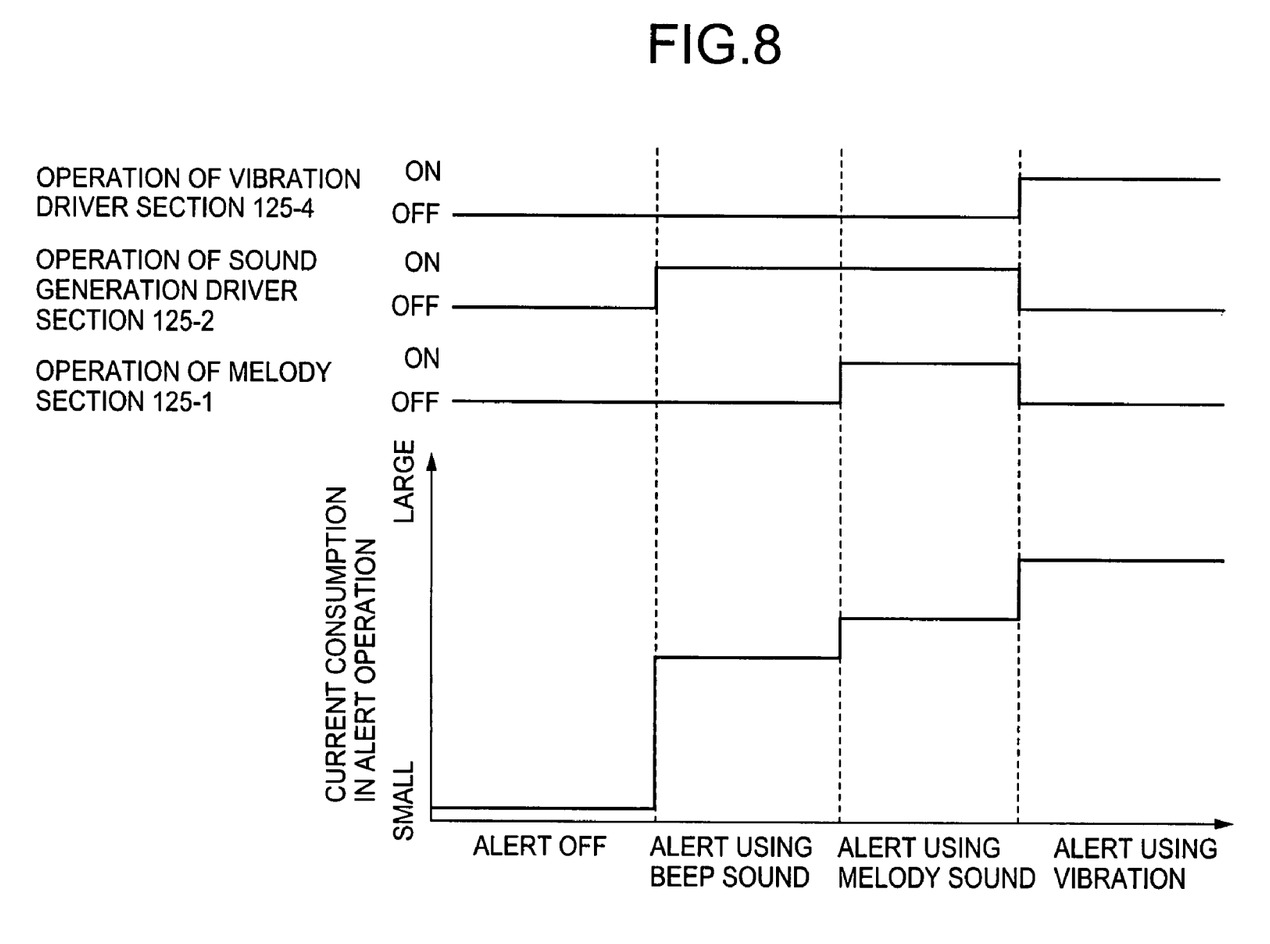
FIG. 8 is a view for explaining the relationship between the operation and current consumption in the alert section of the selective calling receiver according to the first embodiment of the present invention.

The current consumption of the alert section 125 during the alert operation will be described with reference to FIG. 8. FIG. 8 shows the current consumption for each sound pattern.

The current consumption when the alert operation is executed on the basis of the setting information shown in FIG. 5 is shown in the diagram of FIG. 8. The current consumption becomes low in the order of alert using vibration—alert using a melody—alert using beep sound.

Figure 9:
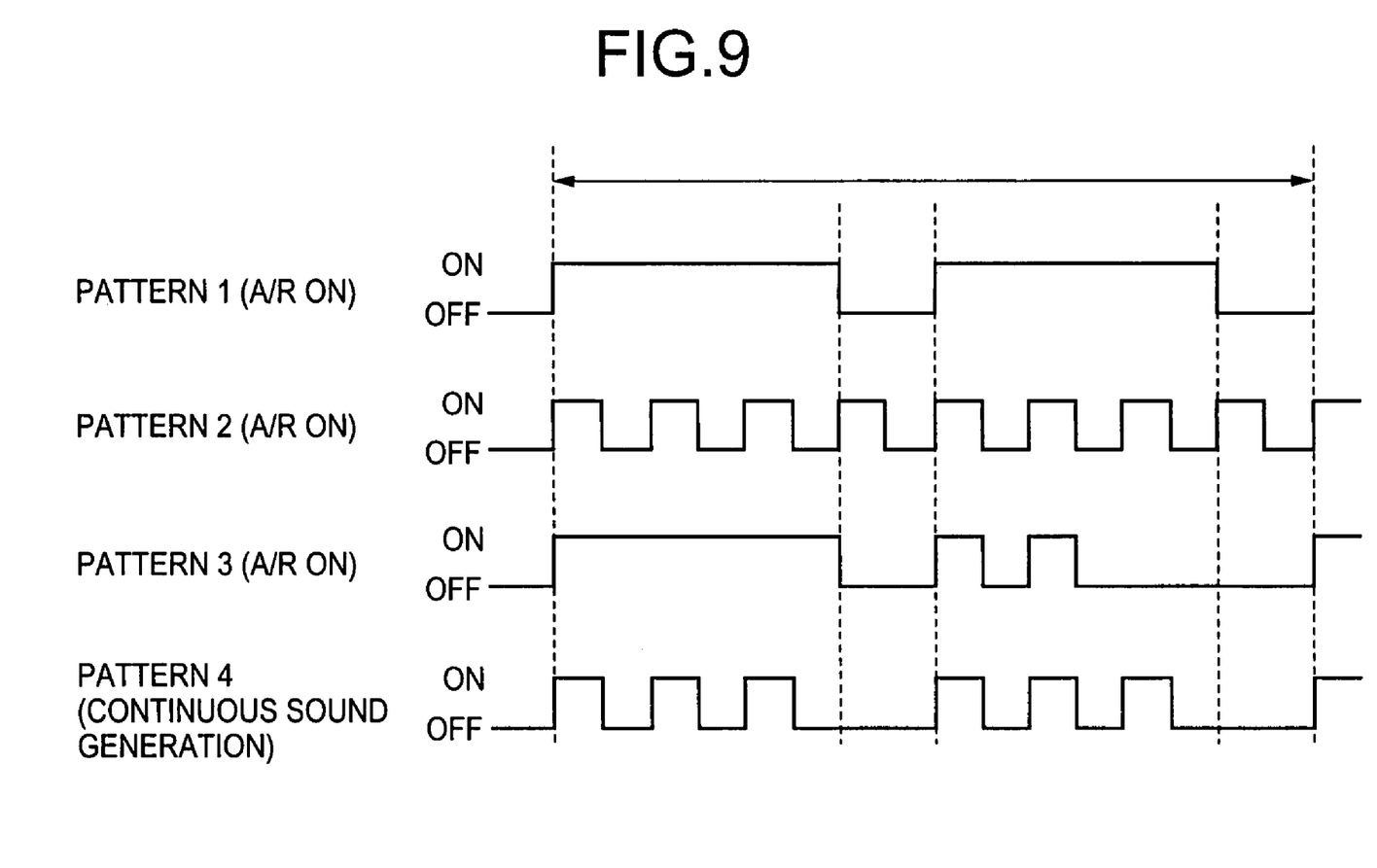
FIG. 9 is a view for explaining sound patterns in the alert operation of the selective calling receiver according to the first embodiment of the present invention.

FIG. 9 shows the waveform of each sound, pattern of beep sound. When a sound pattern with a short operation time is employed as a sound pattern for continuous sound generation, the operation time of the alert section 125 can be shortened (i.e., the current consumption is reduced). As a result, the continuous sound generation time can be made long.

In the receiver of the present invention, since the user is notified of a call using a dedicated pattern of beep sound, he/she can clearly grasp the degree of emergency of the call with the auditory sense. When a dedicated pattern of beep sound with the least current consumption is employed for alert using continuous sound generation, the sound generation alert time in continuous sound generation can be prolonged.

Figure 10:
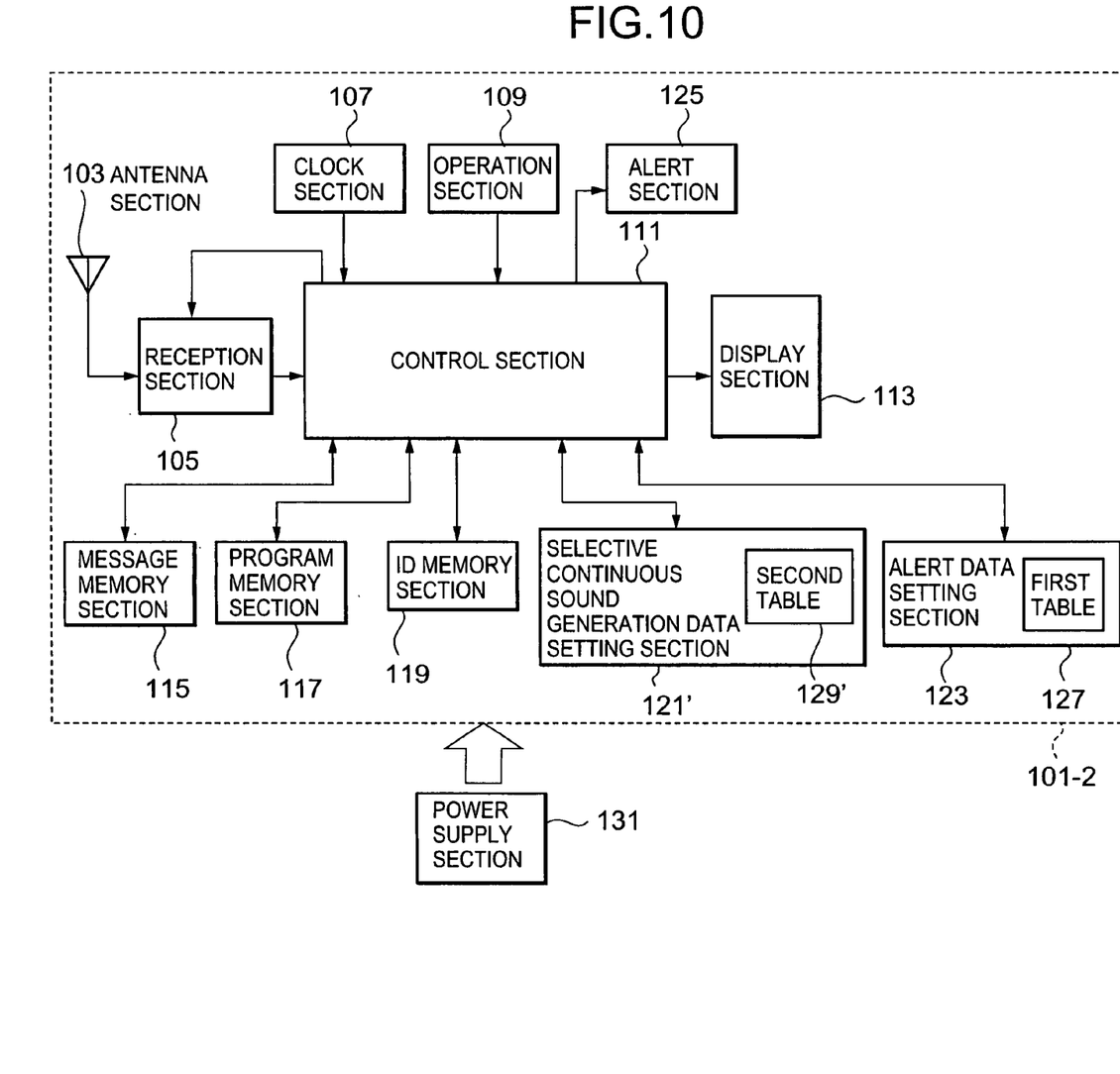
FIG. 10 is a block diagram showing the schematic arrangement of a selective calling receiver according to the second embodiment of the present invention.

FIG. 10 is a block diagram of a selective calling receiver according to the second embodiment of the present invention. The same reference numerals as in the first embodiment denote the same constituent elements in the second embodiment, and a detailed description thereof will be omitted.

A selective calling receiver (to be referred to as a receiver hereinafter) 101-2 according to the second embodiment selectively sets the frequency and volume of sound in setting information for continuous sound generation. This receiver 101-2 has a selective continuous sound generation data setting section 121' in place of the continuous sound generation data setting section 121 of the above-described first embodiment.

Figure 11:
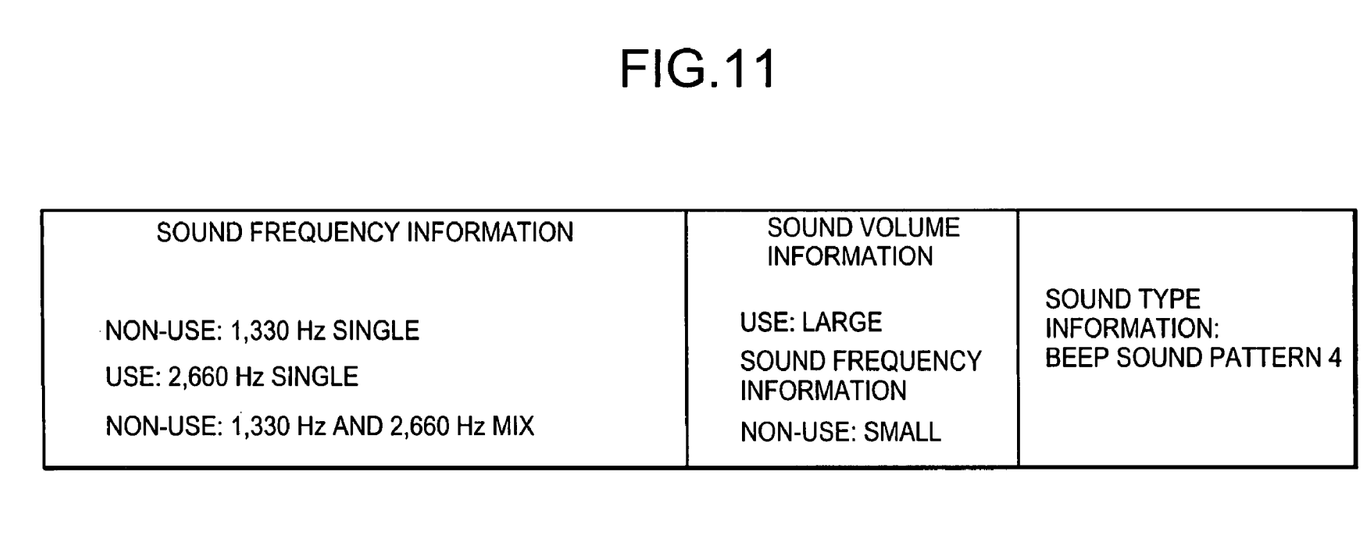
FIG. 11 is a view for explaining setting information stored in the second table in the second embodiment of the present invention.

The selective continuous sound generation data setting section 121' has a second table 129'. FIG. 11 shows setting information in the second table 129'. The frequency of beep sound and the volume of sound are selected from a plurality of frequencies and volumes set in advance, respectively.

As shown in FIG. 11, in the second embodiment, the frequency of beep sound is set at "2,660 Hz", and the volume of sound is set at "large". The user can change the settings by externally inputting them from an operation section 109 while listening to sound from an alert section 125 (loudspeaker section).

Figure 12:
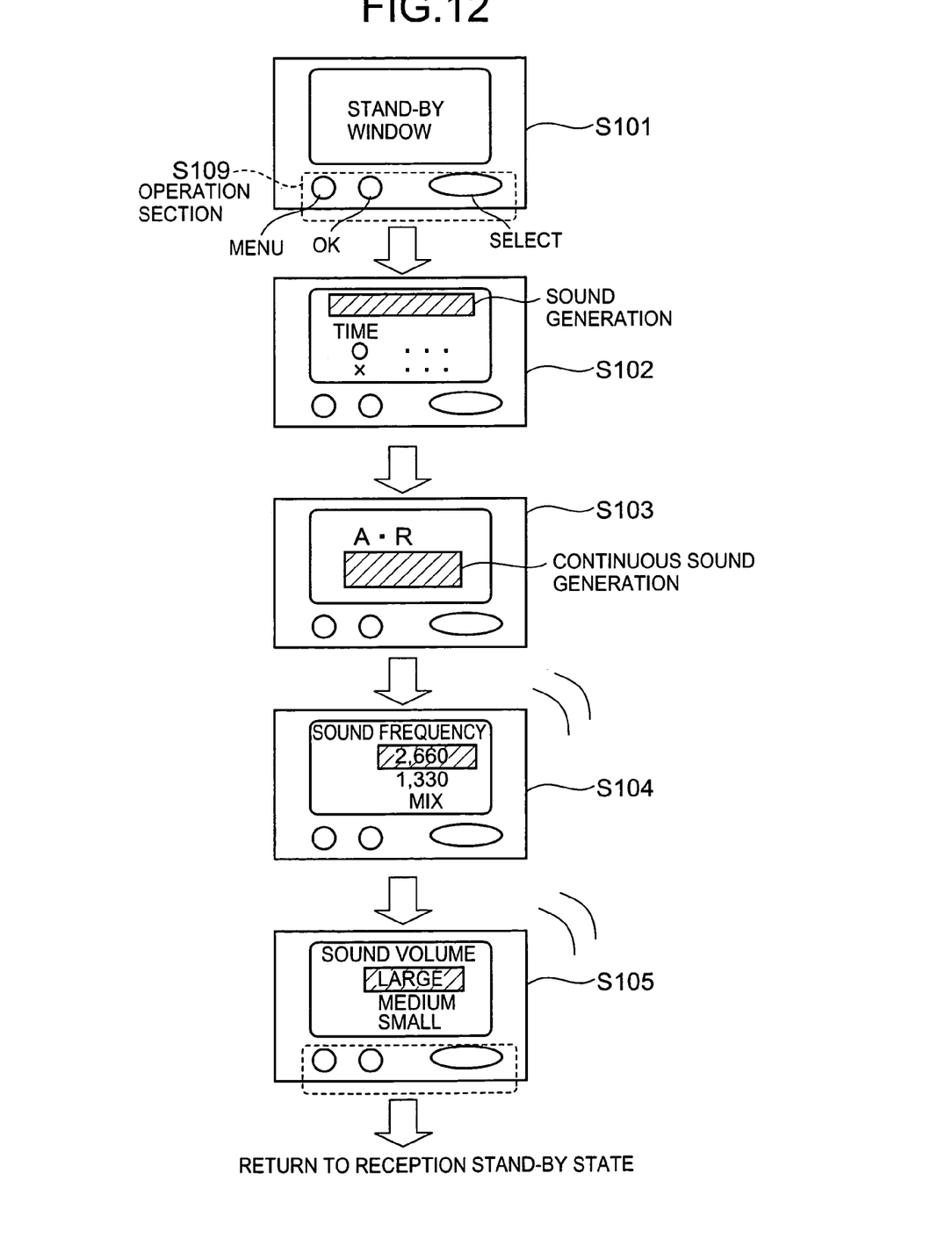
FIG. 12 is a view for explaining the setting procedures of setting information stored in the second table in the second embodiment of the present invention.

FIG. 12 shows the setting procedures of setting information in the second table 129'. First, when the "MENU" key of the operation section 109 is pressed in the reception stand-by state, the menu window is displayed (step S101).

"Sound" is selected with the selection key of the operation section 109, and the OK key is pressed (step S102). Next, "continuous sound generation" is selected with the selection key of the operation section 109, and the OK key is pressed (step S103).

While listening to the sound generated from a loudspeaker section 125-3, "2,660 Hz" is selected with the selection key of the operation section 109, and the OK key is pressed (step S104).

Finally, while listening to the sound generated from the loudspeaker section 125-3, "large" is selected with the selection key of the operation section 109 for the volume of sound, and the OK key is pressed (step S105). With the above procedures, the user can set alert using continuous sound generation that is easier to understand.

Figure 13:
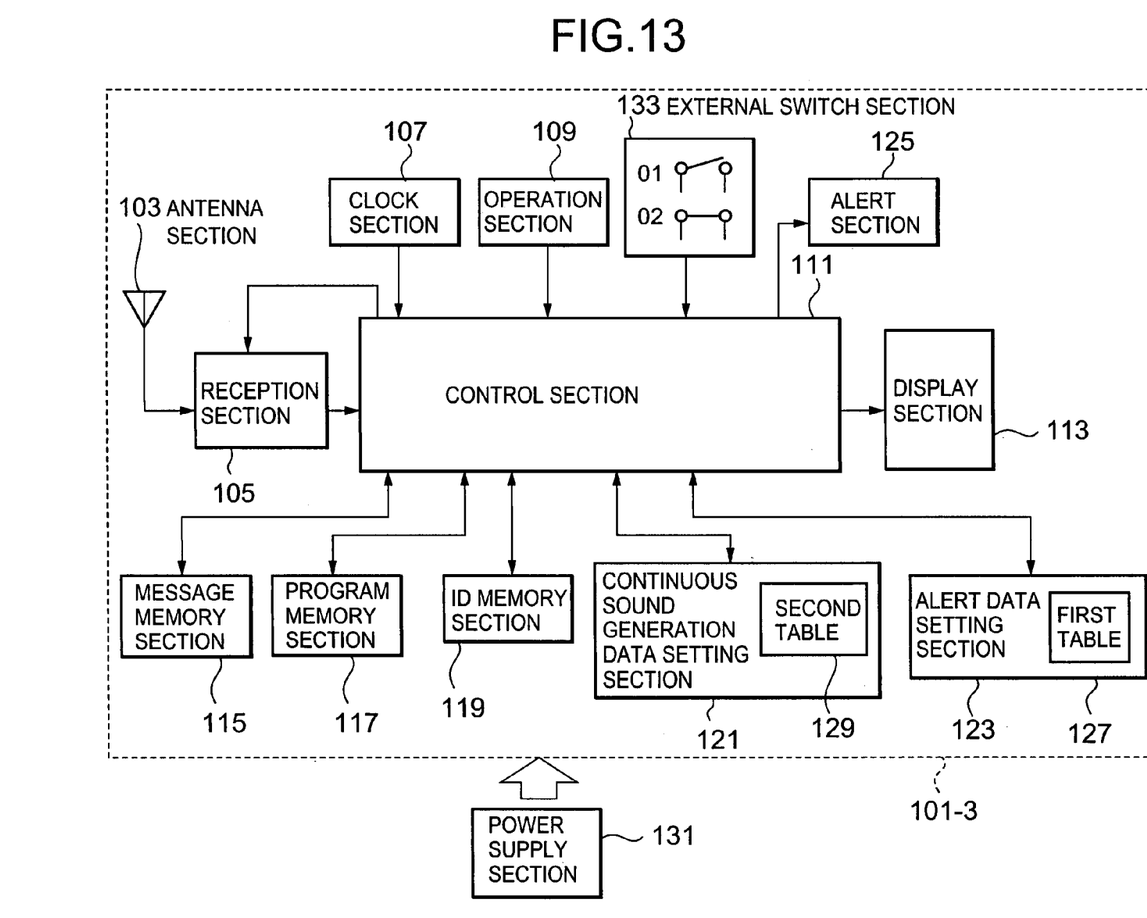
FIG. 13 is a block diagram showing the schematic arrangement of a selective calling receiver according to the third embodiment of the present invention.

FIG. 13 is a block diagram showing of a selective calling receiver according to the third embodiment of the present invention. The same reference numerals as in the first embodiment denote the same constituent elements in the third embodiment, and a detailed description thereof will be omitted.

The selective calling receiver (to be referred to as a receiver hereinafter) 101-3 according to the third embodiment has a means for switching between setting for automatically stopping vibration and setting for continuous sound generation by a one-touch operation. The receiver 101-3 has an external switch section 133 in addition to the arrangement of the above-described first embodiment.

When the external switch section 133 is set at an alert operation using vibration (01), the A/R information (FIG. 4) is switched to "ON" even when a first table 127 has setting information for continuously generating sound, and the alert operation using vibration is executed.

When the external switch section 133 is returned to setting for the alert operation using sound (02), the setting is switched to the alert operation using continuous sound generation.

The third embodiment allows switching between the alert operation using vibration based on setting information with A/R information "ON" in the first table 127 and that using sound based on setting information in a second table 129 in response to an external input operation.

The user can instantaneously select an alert operation according to the situation, resulting in convenience.

What is claimed is:

1. A selective calling receiver comprising:
    an alert section for conducting an alert operation notifying a reception of a message in response to an alert instruction;
    a first table for previously storing first setting information every ID number in which a condition whether said alert operation should be automatically stopped after a predetermined period from the reception of the message or not and another condition to stop automatically said alert operation are set;
    a second table for previously storing second setting information in which a condition of sound generation is set when said alert operation should be continuously conducted; and
    a control section for reading out said first setting information corresponding to the ID number on the basis of the ID number contained in a received radio signal by making reference to said first table, determining whether such a matter that said alert operation should be automatically stopped after the predetermined period is set in said read out first setting information or not, sending said alert instruction to said alert section on the basis of said first setting information when the matter is such that said alert operation should be automatically stopped after the predetermined period is set in said read out first setting information, and sending said alert instruction to said alert section on the basis of said second setting information when the matter is such that said alert operation should not be automatically stopped after the predetermined period is set in said read out first setting information.

2. A receiver according to claim 1, wherein when such a matter that said alert operation is conducted by the sound generation is set in said first setting information, a sound pattern for said sound generation to be automatically stopped and that to be continued are different from each other.

3. A receiver according to claim 1, wherein said first setting information comprises:
    a first instruction for instructing whether said alert operation is to be conducted by vibration or not; and
    a second instruction for instructing whether said alert operation is to be conducted by sound generation or not.

4. A receiver according to claim 3, wherein said second instruction compromises:
    an instruction for a volume of sound;
    an instruction for a pattern of beep sound;
    an instruction for a pattern of melody sound; and
    an instruction for a frequency of the sound.

5. A receiver according to claim 1, wherein said second setting information comprises:
   an instruction for specifying a sound pattern set on the basis of current consumption of said alert section operated in response to the alert instruction; and
   an instruction for a volume of the sound.

6. A receiver according to claim 1, wherein said second setting information contains comprises:
   an instruction for a frequency of the sound, the frequency being selected from a plurality of frequencies set in advance;
   an instruction for a volume of the sound, the volumes being selected from a plurality of volumes set in advance; and
   an instruction for specifying a sound pattern, the sound pattern being set on the basis of current consumption of an alert section operated in response to the alert instruction.

7. A receiver according to claim 1, wherein said receiver further comprises an external switch in which said control section sends the alert instruction to said alert section in response to the operation of said external switch, so that the alert operation based on the second setting information is switched to another alert operation based on the first setting information.

8. A receiver according to claim 7, wherein said another alert operation is an alert operation using vibration.

9. A method of switching an alert operation of a selective calling receiver, comprising the steps of:
   (a) reading out a first setting information on the basis of an ID number contained in a received radio signal by making reference to a first table which previously stores first setting information every ID number, said first setting information including an instruction whether an alert operation should be automatically stopped after a predetermined period from the reception of the message or not
   (b) generating an alert instruction determined on the basis of the first setting information, said first setting information including a first condition of the alert operation, when the instruction is the same for automatically stopping the alert operation;
   (c) making reference to a second table which previously stores second setting information for continuously generating sound and generating an alert instruction determined on the basis of the second setting information, said second setting information including a second condition of the alert operation, when the instruction is the same for inhibiting automatic stop of sound generation; and
   (d) conducting the alert operation in response to the alert instruction.

* * * * *